(12) United States Patent
Park et al.

(10) Patent No.: US 12,026,207 B2
(45) Date of Patent: *Jul. 2, 2024

(54) DEVICE FOR GENERATING USER PROFILE AND SYSTEM COMPRISING THE DEVICE

(71) Applicant: Samsung Electronics Co., Ltd., Gyeonggi-do (KR)

(72) Inventors: Sungdeuk Park, Gyeonggi-do (KR); Sangwook Kang, Gyeonggi-do (KR); Younghoon Kim, Gyeonggi-do (KR); Jaeyung Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,151

(22) Filed: Jul. 1, 2022

(65) Prior Publication Data
US 2022/0335101 A1   Oct. 20, 2022

Related U.S. Application Data

(63) Continuation of application No. 16/690,907, filed on Nov. 21, 2019, now Pat. No. 11,416,569.

(30) Foreign Application Priority Data

Nov. 21, 2018 (KR) .................. 10-2018-0144432

(51) Int. Cl.
G06F 7/02 (2006.01)
G06F 16/00 (2019.01)
(Continued)

(52) U.S. Cl.
CPC ........ G06F 16/9535 (2019.01); G06F 16/951 (2019.01); G06F 16/9538 (2019.01)

(58) Field of Classification Search
CPC . G06F 16/9535; G06F 16/951; G06F 16/9538
See application file for complete search history.

(56) References Cited

U.S. PATENT DOCUMENTS 7,124,129 B2   10/2006   Bowman et al.
7,305,390 B2   12/2007   Bowman et al.
(Continued)

FOREIGN PATENT DOCUMENTS

WO   WO 2017/210753   12/2017

OTHER PUBLICATIONS

International Search Report dated Mar. 12, 2020 issued in counterpart application No. PCT/KR2019/015833, 11 pages.
(Continued)

Primary Examiner — Bruce M Moser
(74) Attorney, Agent, or Firm — The Farrell Law Firm, P.C.

(57) ABSTRACT

An electronic device is provided, which includes a network interface, a memory, and a processor. The processor is configured to receive a query associated with a user profile from the external device, to determine whether the received query corresponds to at least one item included in the user profile, to transmit a response including the at least one item to an external device when the query corresponds to the at least one item, to generate a new item, which corresponds to the query and which is not included in the user profile when the query does not correspond to the at least one item, and to transmit a response determined based on the new item, to the external device.

20 Claims, 11 Drawing Sheets

(51) Int. Cl.
    *G06F 16/951*     (2019.01)
    *G06F 16/9535*    (2019.01)
    *G06F 16/9538*    (2019.01)

(56) References Cited

U.S. PATENT DOCUMENTS

| | | |
|---|---|---|
| 7,606,718 B2 | 10/2009 | Cloran |
| 7,761,446 B2 | 7/2010 | Bowman et al. |
| 7,840,437 B2 | 11/2010 | Lewis |
| 7,921,119 B2 | 4/2011 | Bowman et al. |
| 7,991,764 B2 | 8/2011 | Rathod |
| 8,073,839 B2 | 12/2011 | Rathod |
| 8,103,691 B2 | 1/2012 | Chunilal |
| 8,223,944 B2 | 7/2012 | Cloran et al. |
| 8,332,231 B2 | 12/2012 | Cloran |
| 8,484,042 B2 | 7/2013 | Cloran |
| 8,489,596 B1 | 7/2013 | Milton et al. |
| 8,583,683 B2 | 11/2013 | Rathod |
| 8,626,520 B2 | 1/2014 | Cloran |
| 8,676,833 B2 | 3/2014 | Chunilal |
| 8,682,736 B2 | 3/2014 | Flake et al. |
| 8,719,090 B2 | 5/2014 | Lewis |
| 8,856,075 B2 | 10/2014 | Rathod |
| 8,935,275 B2 | 1/2015 | Rathod |
| 9,053,494 B2 | 6/2015 | Lewis |
| 9,275,114 B2 | 3/2016 | Milton et al. |
| 9,311,400 B2 | 4/2016 | Danninger |
| 9,483,498 B2 | 11/2016 | Milton et al. |
| 9,589,048 B2 | 3/2017 | Milton et al. |
| 9,589,280 B2 | 3/2017 | Milton et al. |
| 10,037,550 B2 | 7/2018 | Narasimha |
| 10,089,367 B2 | 10/2018 | Milton et al. |
| 10,218,808 B2 | 2/2019 | Milton et al. |
| 10,262,330 B2 | 4/2019 | Milton et al. |
| 10,827,037 B2 | 11/2020 | Bati |
| 11,507,975 B2 * | 11/2022 | Gong .................... G06F 16/954 |
| 2002/0024532 A1 | 2/2002 | Fables |
| 2003/0040962 A1 | 2/2003 | Lewis |
| 2007/0112817 A1 | 5/2007 | Danninger |
| 2008/0177728 A1 | 7/2008 | Bowman et al. |
| 2011/0078018 A1 | 3/2011 | Chunilal |
| 2011/0078128 A1 | 3/2011 | Chunilal |
| 2011/0078129 A1 | 3/2011 | Chunilal |
| 2011/0078583 A1 | 3/2011 | Chunilal |
| 2011/0082881 A1 | 4/2011 | Chunilal |
| 2011/0153413 A1 | 6/2011 | Chunilal |
| 2011/0153759 A1 | 6/2011 | Rathod |
| 2011/0154220 A1 | 6/2011 | Chunilal |
| 2011/0161314 A1 | 6/2011 | Chunilal |
| 2011/0161419 A1 | 6/2011 | Chunilal |
| 2011/0162038 A1 | 6/2011 | Chunilal |
| 2011/0225293 A1 | 9/2011 | Rathod |
| 2011/0276396 A1 | 11/2011 | Rathod |
| 2012/0011238 A1 | 1/2012 | Rathod |
| 2012/0011551 A1 | 1/2012 | Levy |
| 2012/0016858 A1 | 1/2012 | Rathod |
| 2012/0102172 A1 | 4/2012 | Rathod |
| 2012/0158517 A1 | 6/2012 | Rathod |
| 2012/0331052 A1 | 12/2012 | Rathod |
| 2014/0337260 A1 | 11/2014 | Narasimha |
| 2015/0030311 A1 | 1/2015 | Lewis |
| 2015/0058129 A1 | 2/2015 | Nevid |
| 2015/0142649 A1 | 5/2015 | Rathod |
| 2015/0227268 A1 | 8/2015 | Rathod |
| 2015/0229592 A1 | 8/2015 | Rathod |
| 2015/0304331 A1 | 10/2015 | Nakagawa et al. |
| 2016/0063121 A1 | 3/2016 | Agarwal |
| 2016/0182242 A1 | 6/2016 | Rathod |
| 2016/0182416 A1 | 6/2016 | Rathod |
| 2016/0182666 A1 | 6/2016 | Rathod |
| 2016/0323693 A1 | 11/2016 | Rathod |
| 2018/0176318 A1 | 6/2018 | Rathod |
| 2019/0258676 A1 | 8/2019 | Sherrard |

OTHER PUBLICATIONS

European Office Action dated Jan. 18, 2024 issued in counterpart application No. 19 887 724.3, 10 pages.

\* cited by examiner

| Category | Index | Index code | value type | Item is on | Item |
|---|---|---|---|---|---|
| | | | static : pre-defined | | |
| PERSONAL INFORMATION | gender | demo.gender | string | device,platform | F |
| | age | demo.age | int | device,platform | 28 |
| | is married | demo.is_married | boolean | device,platform | FALSE |
| | income | demo.income | string | platform | USD 85K-100K |
| | birthday | demo.birthday | data | device,platform | 13-JUL |
| | ... | | | | |
| INTEREST | baseball | interest.baseball.like | boolean | device,platform | FALSE |
| | baseball | interest.baseball.score | decimal | device,platform | 0.00 |
| | music | interest.music.like | boolean | device,platform | TRUE |
| | music | interest.music.score | decimal | device,platform | 0.35 |
| | ... | | | | |
| SERVICE | sushi | cap.a.favorite.sushi.menu | list | device,platform | maguro,ebi,tako |
| | wine | cap.b.favorite.wine.menu | list | device,platform | sparkling,almond |
| REQUEST | request | request.favorite.beer | boolean | device,platform | FALSE |
| | request | request.favorite.beverage | list | platform | juice,water |
| | | | dynamic | | |
| ad-hoc | yes-no | adhoc.yes-no?q=espresso | boolean | N/A | TRUE |
| | choice | adhoc.choice?q=[espresso,milk,tea,water] | list | N/A | espresso,water |
| | ranking | adhoc.ranking?q=[espresso,milk,tea,water] | list | N/A | espresso,water,milk,tea |

FIG.6

| profile | category | Index | Index code | value type | item is on | logic or algorithme |
|---|---|---|---|---|---|---|
| A | SERVICE | favorite Pizza Menu | cap.a.favoritePizzaMenu | list | platform | when web in $pizze_brands@metadata_web produce rank() on keywords or noun strings as rank order by rank desc; |
| B | SERVICE | favorite Coffee Shop | cap.a.favoriteCoffeeShop | list | platform | when location in $coffee_brands@metadata_poi produce rank() on brand_name as rank order by rank desc; |
| C | SERVICE | favorite CVS | cap.c.favoriteCVS | list | platform | when location in $csv_brands@metadata_poi produce rank() on brand_name as rank order by rank desc; |
| D | SERVICE | selfie frequency score | cap.d.selfie.freq.score | decimal | device, platform | when app in $selfie_camera@metadata_app produce normed_usage_score() on frequency; |
| E | SERVICE | selfie duration score | cap.d.selfie.duration.score | decimal | device, platform | when app in $selfie_camera@metadata_app produce normed_usage_score() on duration; |
| F | SERVICE | selfie duration score | cap.e.selfie.duration.score | decimal | device, platform | when app in $selfie_camera@metadata_app_for_capsule produce normed_usage_score() on duration; |
| ... | | | | | | ... |

FIG.9

DEVICE FOR GENERATING USER PROFILE AND SYSTEM COMPRISING THE DEVICE

CROSS-REFERENCE TO RELATED APPLICATION(S)

This application is a Continuation of U.S. patent application Ser. No. 16/690,907, which was filed with the U.S. Patent and Trademark Office on Nov. 21, 2019, and claims priority under 35 U.S.C. § 119 to Korean Patent Application No. 10-2018-0144432, which was filed in the Korean Intellectual Property Office on Nov. 21, 2018, the entire disclosure of each of which is incorporated by reference herein.

BACKGROUND

1. Field

The disclosure relates generally to a technology for generating a user profile.

2. Description of Related Art

Service providers may provide users with a personalized service by collecting various information associated with a user, analyzing the collected information, and generating a user profile.

In this process, it is not easy for the service providers to directly establish a user profile generating module. For example, it is impossible or difficult for the service providers to collect personal information. Accordingly, a service that provides a user profile may be operated separately. The service providers may make a request for information about the user profile to an external server and may provide the personalized service based on the user profile received from the external server, without directly generating the user profile.

In a system providing a user profile, when there are various services, a type of user profile necessary for each service and a type of user profile to be collected may be different. Even though the corresponding system collects various pieces of data based on various services and profiles, there may be a case in which information desired by a user utilizing a third party service is not capable of being provided.

SUMMARY

The present disclosure has been made to address the above-mentioned problems and disadvantages, and to provide at least the advantages described below.

In accordance with an aspect of the disclosure, a first electronic device is provided that includes a communication circuit configured to communicate with a second electronic device operated by a service provider providing a first service; a memory configured to store a plurality of indexes and a plurality of items, each of the plurality of indexes is matched with at least one item; a processor operatively connected to the communication circuit and the memory, with the processor being configured to receive a query message from the second electronic device through a communication channel established between the first electronic device and the second electronic device, extract a keyword included in the query message, when the keyword corresponds to a first index among of the plurality of indexes, transmit a first response message including at least one item matched with the first index to the second electronic device through the communication channel, when the keyword does not correspond to the plurality of indexes, select a second index in which a correlation indicating a relationship between the keyword and the second index is not less than a threshold value, the second index is one of the plurality of indexes, generate a second response message based one at least one item matched with the second index, and transmit the second response message to the second electronic device.

In accordance with another aspect of the disclosure, an operation method is provided of a first electronic device including memory configured to store a plurality of indexes and a plurality of items, with each of the plurality of indexes being matched with at least one item, the method including establishing a communication circuit with a second electronic device operated by a service provider providing a first service; receiving a query message from the second electronic device through a communication channel established between the first electronic device and the second electronic device; extracting a keyword included in the query message; when the keyword corresponds to a first index among of the plurality of indexes, transmitting a first response message including at least one item matched with the first index to the second electronic device through the communication channel; when the keyword does not correspond to the plurality of indexes, selecting a second index in which a correlation indicating a relationship between the keyword and the second index is not less than a threshold value, the second index is one of the plurality of indexes; generating a second response message based one at least one item matched with the second index; and transmitting the second response message to the second electronic device.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 illustrates a data structure of profile data, according to an embodiment;

FIG. 9 illustrates a data structure of newly added profile data, according to an embodiment.

DETAILED DESCRIPTION

Figure 1:
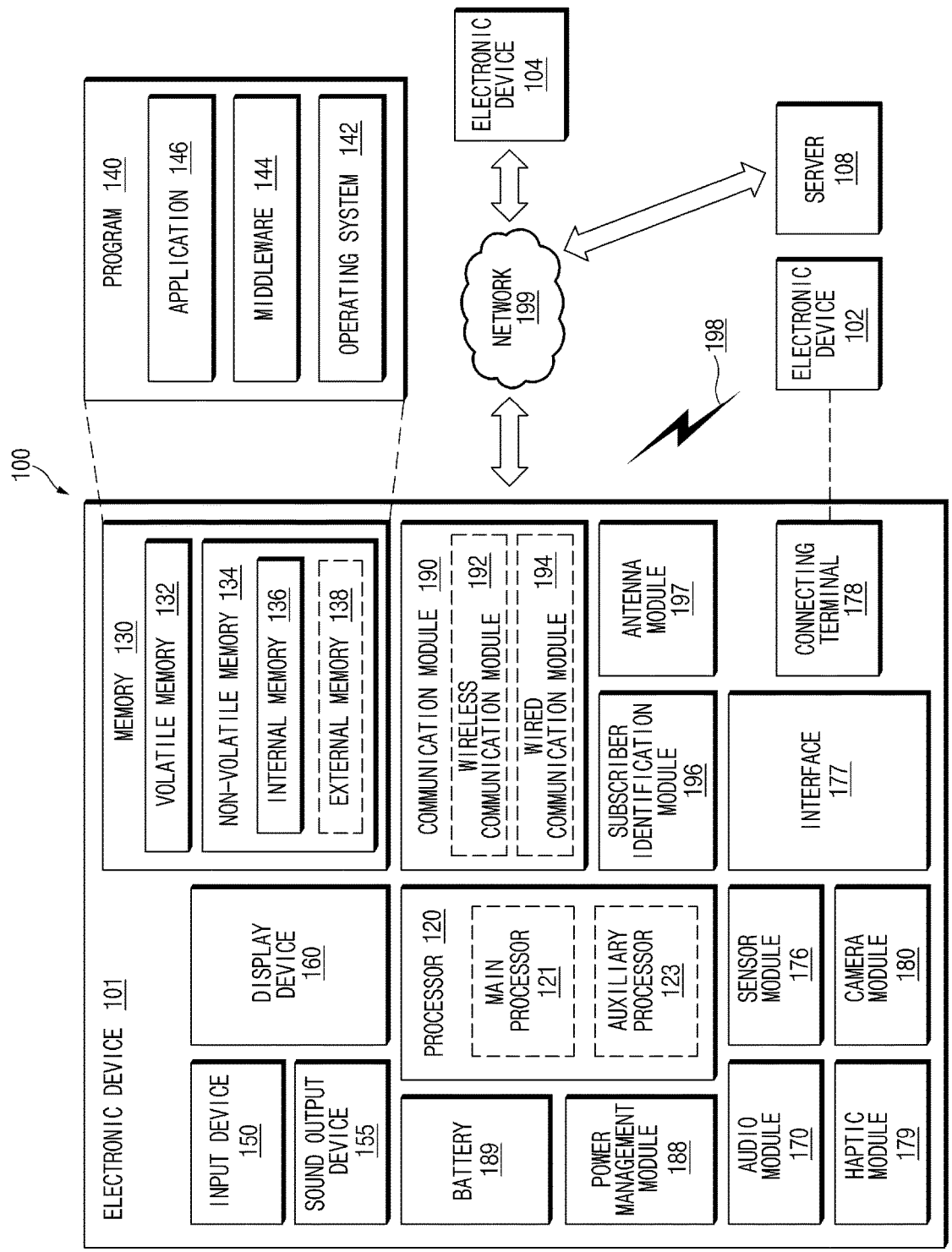
FIG. 1 illustrates an electronic device in a network environment, according to an embodiment.

Various embodiments of the disclosure are described with reference to the accompanying drawings. However, various embodiments of the disclosure are not limited to particular embodiments, and it should be understood that modifications, equivalents, and/or alternatives of the embodiments described herein can be variously made. With regard to description of drawings, similar components may be marked by similar reference numerals.

An aspect of the disclosure is to provide a server device that may provide data suitable for a request when a profile that was not previously prepared is requested, and a system thereof.

FIG. 1 is a block diagram of an electronic device 101 in a network environment 100, according to various embodiments.

Referring to FIG. 1, the electronic device 101 in the network environment 100 may communicate with an electronic device 102 over a first network 198 (e.g., a short range wireless communication) or may communicate with an electronic device 104 or a server 108 over a second network 199 (e.g., a long range wireless communication). The electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In any embodiment, the electronic device 101 may not include at least one (e.g., the display device 160 or the camera module 180) of the above-described components or may further include one or more other components. In any embodiment, some of the components may be implemented as a single integrated circuit. For example, the sensor module 176 (e.g., a fingerprint sensor, an iris sensor, or an illuminance sensor) may be implemented while being embedded in the display device 160 (e.g., a display).

For example, the processor 120 may execute software (e.g., a program) to control at least another component (e.g., hardware or software component) of the electronic device 101 connected to the processor 120, and may process and calculate various types of data. According to an embodiment, as at least part of data processing or calculation, the processor 120 may load instructions or data received from other components (e.g., the sensor module 176 or the communication module 190) into a volatile memory 132, may process instructions or data stored in the volatile memory 132, and may store the result data in a nonvolatile memory 134. According to an embodiment, the processor 120 may include a main processor 121 (e.g., a central processing unit or an application processor) and an auxiliary processor 123 (e.g., a graphic processing unit, an image signal processor, a sensor hub processor, or a communication processor) capable of operating independently or together with the main processor. Additionally or alternatively, the auxiliary processor 123 may use lower power than main processor 121 or may be configured to be specialized to a specified function. The auxiliary processor 123 may be implemented separately from the main processor 121 or as part of the main processor 121.

For example, the auxiliary processor 123 may control at least part of the functions or states associated with at least one (e.g., the display device 160, the sensor module 176, or the communication module 190) of the components of the electronic device 101, instead of the main processor 121 while the main processor 121 is in an inactive (e.g., sleep) state or together with the main processor 121 while the main processor 121 is in an active (e.g., the execution of an application) state. According to an embodiment, the auxiliary processor 123 (e.g., an image signal processor or a communication processor) may be implemented as a part of operatively associated other components (e.g., the camera module 180 or the communication module 190).

The memory 130 may store various pieces of data used by at least one component (e.g., the processor 120 or the sensor module 176) of the electronic device 101. For example, data may include software (e.g., a program 140) and input data or output data for instructions associated with the software. The memory 130 may include, for example, the volatile memory 132 or the nonvolatile memory 134.

The program 140 may be stored as software in the memory 130 and may include, for example, an operating system 142, a middleware 144, or an application 146.

The input device 150 may receive instructions or data to be used for the component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for a general purpose, such as multimedia play or recording play, and the receiver may be used to receive an incoming call. According to an embodiment, the receiver may be implemented separately from the speaker or may be implemented as a part of the speaker.

The display device 160 may visually provide information to the outside (e.g., the user) of the electronic device 101. The display device 160 may include, for example, a display, a hologram device, or a projector and a control circuit for controlling a corresponding device. According to an embodiment, the display device 160 may include a touch circuitry configured to sense a touch, or a sensor circuitry (e.g., a pressure sensor) configured to measure the strength of force generated by the touch.

The audio module 170 may convert sound to an electrical signal, or reversely, may convert an electrical signal to sound. According to an embodiment, the audio module 170 may obtain sound through the input device 150, or may output sound through the sound output device 155, or through an external electronic device (e.g., the electronic device 102) (e.g., a speaker or a headphone) directly or wirelessly connected with the electronic device 101.

The sensor module 176 may sense an operation state (e.g., power or a temperature) of the electronic device 101 or an external environment state (e.g., a user state), and may generate an electrical signal or a data value corresponding the sensed state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 101 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connecting terminal 178 may include a connector that may allow the electronic device 101 to be physically connected with an external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal to a mechanical stimulation (e.g., vibration or movement) or an electrical stimulation which the user may perceive through the sense of touch or the sense of movement. According to an embodiment, the haptic module 179 may include, for example, a motor, a piezoelectric sensor, or an electrical stimulation device.

The camera module 180 may photograph a still image and a video. According to an embodiment, the camera module 180 may include one or more lenses, image sensors, image signal processors, or flashes (or electrical flashes).

The power management module 188 may manage the power which is supplied to the electronic device 101. According to an embodiment, the power management module 188 may be implemented, for example, as at least part of a power management integrated circuit (PMIC).

The battery 189 may power at least one component of the electronic device 101. According to an embodiment, the battery 189 may include, for example, a primary cell not rechargeable, a secondary cell rechargeable, or a fuel cell.

The communication module 190 may establish a direct (or wired) communication channel or a wireless communication channel between the electronic device 101 and an external electronic device (e.g., the electronic device 102, the electronic device 104, or the server 108) and may perform communication through the established communication channel. The communication module 190 may include one or more communication processors which are operated independently of the processor 120 (e.g., an application processor) and support direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). A corresponding communication module of such communication modules may communicate with an external electronic device over the first network 198 (e.g., a short range communication network such as Bluetooth, Wi-Fi direct, or infrared data association (IrDA)) or the second network 199 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 192 may identify and authenticate the electronic device 101 within a communication network, such as the first network 198 or the second network 199, by using subscriber information (e.g., international mobile subscriber identity (IMSI)) stored in the subscriber identification module 196.

The antenna module 197 may transmit a signal or a power to the outside (e.g., an external electronic device) or may receive a signal or a power from the outside. According to an embodiment, the antenna module may include one antenna including a radiator made of a conductor or a conductive pattern formed on a substrate (e.g., a PCB). According to an embodiment, the antenna module 197 may include a plurality of antennas. In this case, at least one antenna suitable for a communication scheme used in a communication network such as the first network 198 or the second network 199 may be selected, for example, by the communication module 190 from the plurality of antennas. The signal or power may be exchanged between the communication module 190 and an external electronic device through the selected at least one antenna or may be received from the external electronic device through the selected at least one antenna and the communication module 190. According to any embodiment, another component (e.g., RFIC) in addition to the radiator may be further formed as the part of the antenna module 197.

At least part of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 101 and the external electronic device 104 through the server 108 connected to the second network 199. Each of the electronic devices 102 and 104 may be a device of which the type is different from or the same as that of the electronic device 101. According to an embodiment, all or a part of operations to be executed in the electronic device 101 may be executed in one or more external devices of the external electronic devices 102, 104, or 108. For example, in the case where the electronic device 101 should perform any function or service automatically or in response to a request from the user or any other device, the electronic device 101 may additionally request one or more external electronic devices to perform at least part of the function or service, instead of internally executing the function or service. The one or more external electronic devices which receive the request may execute at least a part of the function or service thus requested or an additional function or service associated with the request, and may provide a result of the execution to the electronic device 101. The electronic device 101 may process the result as it is or additionally, and may provide the processed result as at least part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

Various embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the disclosure may be implemented with software (e.g., the program 140) including one or more instructions stored in a storage medium (e.g., the internal memory 136 or the external memory 138) readable by a machine (e.g., the electronic device 101). For example, the processor (e.g., the processor 120) of the machine (e.g., the electronic device 101) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semi-permanently stored in the storage medium and the case where the data is stored temporarily.

Figure 2:
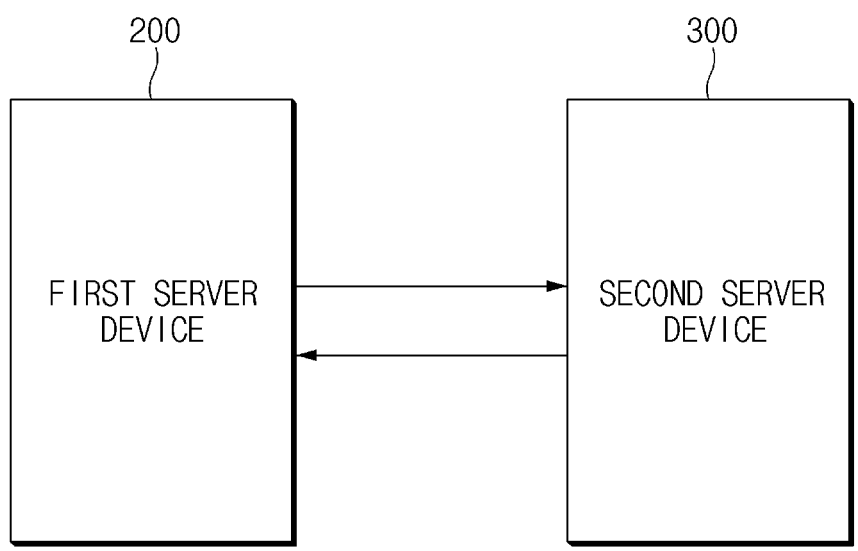
FIG. 2 illustrates an operating environment of an intelligent system, according to an embodiment.

FIG. 2 illustrates an operating environment of an intelligent system, according to an embodiment.

Referring to FIG. 2, an intelligent environment 10 includes a first server device 200 (or the first server system) and a second server device 300. The first server device 200 may provide various services in conjunction with the plurality of second server devices 300. The second server device 300 may be a server device operated by a specific service provider. The operator of the second server device 300 may be the same as the operator of the first server device 200 or may be a third party different from the operator of the first server device 200. When the operator of the first server device 200 is the same as the operator of the second server device 300, the second server device 300 may be designed to have high access permission to data recorded in the first server device 200. When the operator of the first server device 200 is different from the operator of the second server device 300, the second server device 300 may be designed to have low access permission to data recorded in the first server device 200.

The first server device 200 may communicate with the second server device 300 operated by the same operator or a different operator and may transmit or receive data to or from each other. The first server device 200 may communicate with an electronic device 101 (e.g., a smartphone or a tablet PC) in which an application distributed by the second server device 300 is installed and may transmit or receive data to or from the corresponding electronic device. For example, the first server device 200 may collect and manage the data entered by the user of an electronic device 101 or the data pre-stored in an electronic device 101 associated with the user. The first server device 200 may generate a user profile based on the collected data. The second server device 300 may make a request for the data associated with a specific user to the first server device 200, and the first server device 200 may provide the data associated with the specific user to the second server device 300 based on the user profile. The second server device 300 may provide a specific user with the customized service based on the received data. The first server device 200 may constitute user-related data or a user profile in a form including an index (e.g., a name, a gender, an age, and a preferred food) and an item (e.g., Hong Gil-dong, male, 30 years, and tomato/onion) mapped to or matched with the corresponding index.

When a user device accesses the second server device 300, the second server device 300 may transmit, to the first server device 200, a query message for data associated with the accessing user device or data associated with a user operating the user device. The first server device 200 receiving the query message may extract at least one keyword from the query message and may detect information associated with the extracted keyword from the pre-stored user-related data. For example, the first server device 200 may detect the index associated with the keyword from the user-related data in which the index and the at least one item are matched with each other and may provide the second server device 300 with items associated with the detected index as a response message. Alternatively, when the index corresponding to the keyword is not present, the first server device 200 may determine the relationship between indexes and the keyword to select at least one index and may identify the relationship between at least one items mapped to the selected index to generate the response message. Further, when the index corresponding to the keyword is not present, the first server device 200 may detect an index of which the similarity with the keyword is not less than a specified value, and the first server device 200 may provide the second server device 300 with items matched with the corresponding index or a combination of items through the response message, or may identify the relationship between the items to provide data according to a relationship identification as the response message.

Figure 3A:
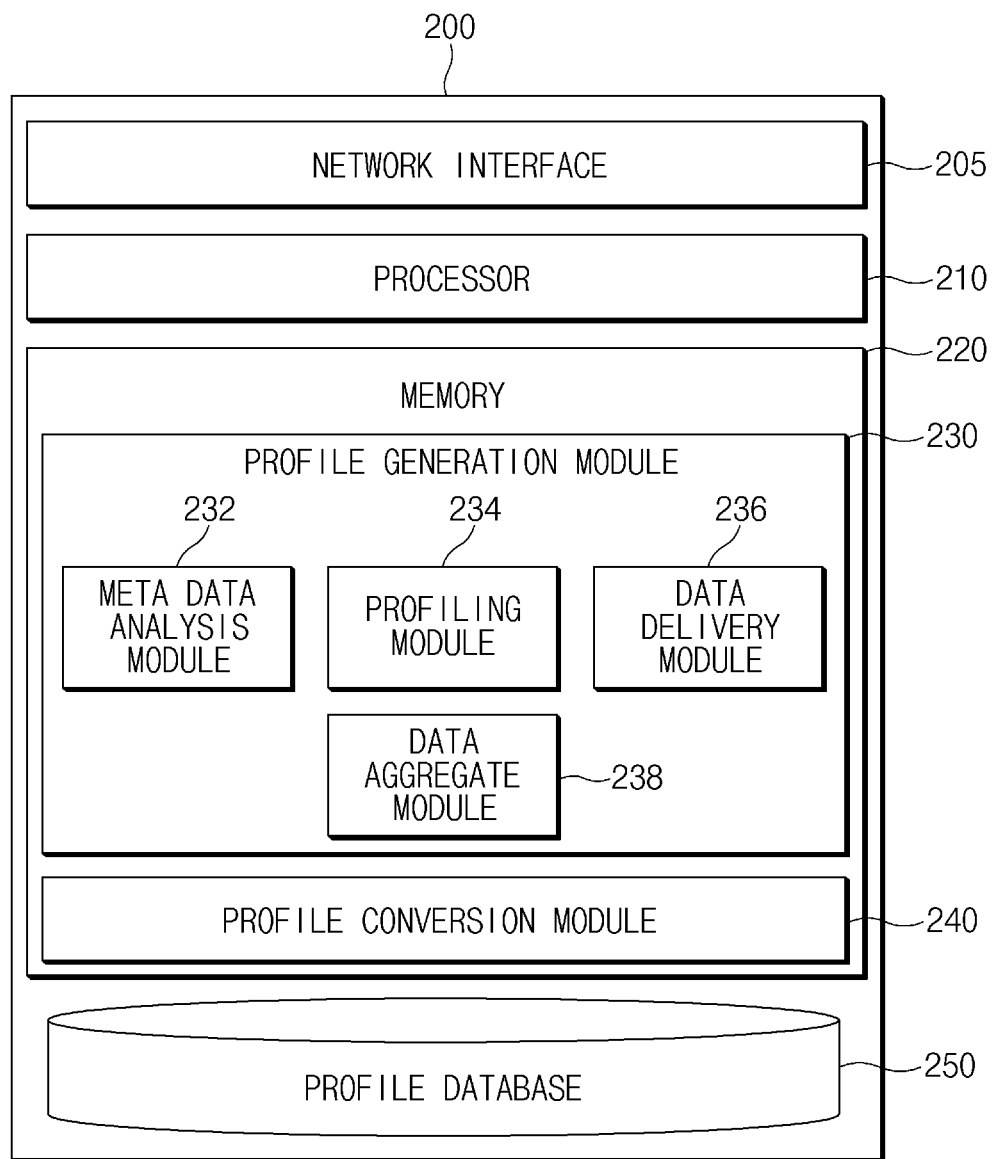
FIG. 3A is a block diagram of a server device, according to an embodiment.
Figure 3B:
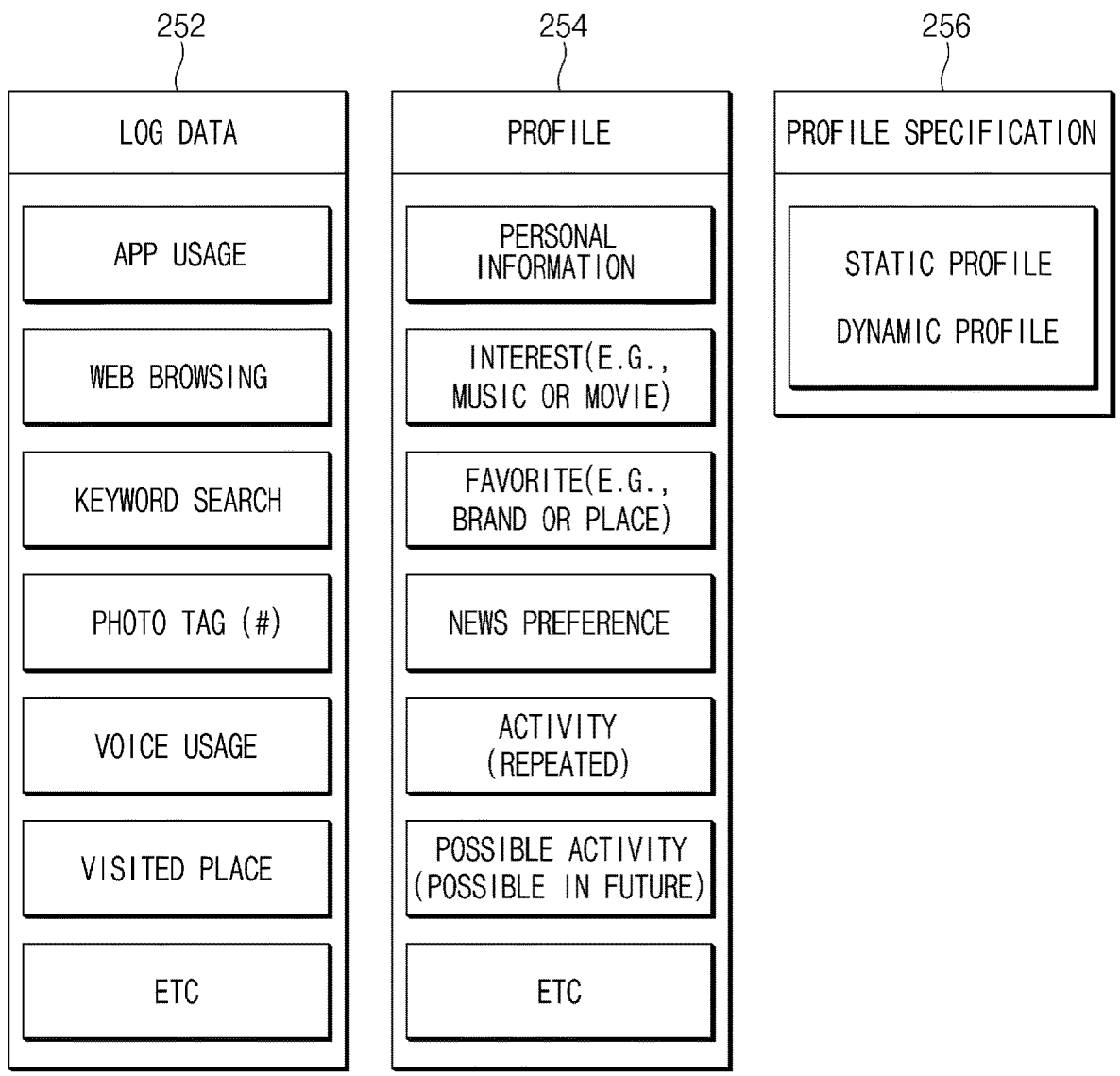
FIG. 3B is an example of data stored in a profile database, according to an embodiment.

FIG. 3A is a block diagram of a server device, according to an embodiment. FIG. 3B is an example of data stored in a profile database, according to an embodiment.

Referring to FIGS. 3A and 3B, the first server device 200 includes a network interface 205, a processor 210, a memory 220, and a profile database 250.

Referring to FIG. 3A, the first server device 200 may communicate with an external device through the network interface 205. For example, the external device may be another server device 300 or an electronic device 101. The memory 220 includes (or stores) a profile generation module 230 and a profile conversion module 240. The profile generation module 230 may collect data associated with a user and may generate the personalized user profile. For example, the user profile may include data associated with a specific user registered in a service provided through the first server device 200 and/or the second server device 300. The user profile may include data for at least one of the personal information about the specific user, the interest of the specific user, or a favorite characteristic of the specific user.

The profile generation module 230 includes a meta data analysis module 232, a profiling module 234, a data delivery module 236, and a data aggregate module 238. The profile generation module 230 may be implemented by merging at least two or more of the above-described modules (i.e., the meta data analysis module 232, the profiling module 234, the data delivery module 236, and the data aggregate module 238). The profile generation module 230 (or modules) may be implemented with one or more hardware processors or one or more software modules, and may operate so as to be driven by at least one processor to process a corresponding function.

The data aggregate module 238 may collect data from the electronic device of a user or the server operated by a service provider. The collected data may be stored as log data 252. The meta data analysis module 232 may analyze meta data for the log data 252. For example, when the specific user executes a pizza-related application (e.g., pizza order application) and then orders a pizza by using the corresponding application, the log data 252 may include log information such as the execution of the pizza-related application, the access to a pizza providing service device, transmission and reception of a message, or a payment for ordering a pizza. In this procedure, the meta data analysis module 232 may obtain data for a pizza related service (a first service) as a type of meta data. For example, when obtaining a pizza related application identification (ID) "kr.co.d2.A" (a first related application ID), a pizza related universal resource locator (URL) (a first URL), "www.A.co.kr", and a pizza related keyword (e.g., "pizza 'A', "A") (a first keyword) as the meta data, the meta data analysis module 232 may analyze the obtained meta data to select data capable of being applied to a user profile.

The profiling module 234 may generate or update a user profile based on the data analyzed by the meta data analysis module 232. For example, the profiling module 234 may add "pizza" as a new index in the meta data and then may write a pizza menu (e.g., shrimp pizza) ordered by the user, as the matching item for "pizza". Alternatively, when the "pizza" index is already present, the profiling module 234 may add "shrimp pizza" as a new item. Alternatively, when both the index "pizza" and the index "shrimp pizza" are present, the preference or usage count of the index "pizza" and "shrimp pizza" may be updated. When receiving a query message from the second server device 300, the data delivery module 236 may deliver a response message in response to the received query message. In this regard, the data delivery module 236 may provide a communication interface (e.g., public application program interface (API)) between an external device and the electronic device of the user.

The profile generation module 230 and the profile conversion module 240 may include instructions executed by the processor 210. Modules described herein may be implemented by hardware or software. The operation performed by the profile generation module 230 and the profile conversion module 240 may be performed by the processor 210 of the first server device 200. Two or more modules of the meta data analysis module 232, the profiling module 234, the data delivery module 236, and the data aggregate module 238 may be integrated.

The data associated with a user may include data in various forms. For example, the data associated with the user may include the log data 252 associated with the user. The log data 252 may include the usage records of an application or the setting state of the electronic device of the user. The log data 252 may include the data history (e.g., account information or a user log generated by the first server device 200) transmitted or received between the electronic device of the user and the first server device 200. The profile generation module 230 may analyze the log data 252 and may generate a user profile 254.

The log data 252 and the profile 254 may be stored in the profile database 250. However embodiments are not limited thereto. The log data 252 and/or the profile 254 may be stored in the memory 220 or may be stored in another type of database. Alternatively, the log data 252 and the profile 254 may be stored in a separate memory distribution server device and may be implemented to provide the first server device 200 with log data and a profile through a communication interface.

The log data 252 may include log data associated with application usage of an electronic device, log data associated with web browsing, log data for the found keywords, log data for tags included in an image file, log data associated with voice function usage, and log data associated with the user's location. The profile 254 may include the index and at least one item generated based on the log data 252. The profile 254 may include various categories such as the user's personal information, interests, favorite characteristics, news preferences, and/or activities. At least one index may belong to each category, or at least one or more items may be matched with at least one index. Hereinafter, each of the items may be referred to as an "index".

For example, the log data 252 and the profile 254 may be mapped to a specific user (or the electronic device of the specific user) and then may be stored. In this case, the log data 252 and the profile 254 associated with the specific user may correspond to a user profile. Alternatively, when the log data 252 and the profile 254 are not mapped to the specific user, the log data 252 and the profile 254 may correspond to (or be mapped to) the general profile for general users.

The profile 254 may include a group profile for a plurality of users. The group profile may be generated based on the log data 252 obtained from users included in a specific group.

The first server device 200 may transmit at least part of a user profile to the second server device 300 at the request of the second server device 300. When receiving a request for the item pre-stored in the profile 254, the first server device 200 may transmit the response including the stored item to the second server device 300.

When receiving a request for an item, which is not currently stored in the profile 254, from an external device (e.g., the second server device 300), the first server device 200 may generate a new item. The profile conversion module 240 may analyze the log data 252 and/or the profile 254, may generate a new item based on the analysis result, and may transmit a response including the newly generated item to the second server device 300. The profile conversion module 240 may update a user profile based on the received requests. For example, when receiving requests associated with the specific service, the newly generated item may be mapped to the specific service and then may be stored in the memory 220 or the profile database 250.

In at least part of the specific user profile, "workout" may be present as a category; in at least part of the specific user profile, "baseball" may be present as the index of "workout"; and at least part of the specific user profile may include "Samsung or SK" as an item for "baseball". When receiving a request for information about a soccer team, which a user likes, from the second server device 300, the first server device 200 may generate "soccer" as an index, may generate "Seoul football club (FC)" as a new item through the relationship analysis for the items. For example, "Samsung or SK" may be provided to the second server device 300 with a response message including the new item. In the provision procedure, the first server device 200 may provide a notification that there is no direct information about the soccer team that the user likes and may provide a notification that the Seoul FC information is information inferred based on the baseball team that the user likes. In a procedure of generating the new item, the first server device 200 may select a soccer team, which the user prefers based on items for the "baseball" index, (e.g., the home of Samsung or SK) as a new item or may select the soccer team, which the user is likely to prefer based on items for the "baseball" index (e.g., the season score of Samsung or SK), as a new item. When the new item is selected, the first server device 200 may newly add "soccer" index and "Seoul FC" item to the user profile. The first server device 200 may notify a user device (e.g., the electronic device 101 of FIG. 1) that the user profile is scheduled to be updated and may apply the update after the approval is obtained from a user device.

A profile specification 256 may include a static profile and a dynamic profile. The profile 254 may be classified depending on the specification. The profile capable of being instantly provided to the plurality of second server devices 300 may be classified as the static profile. The profile newly generated by the request of the second server device 300 may be classified as the dynamic profile.

The static profile may include the item that is analyzed in advance and then is stored. Alternatively, the static profile may include an item corresponding to the predefined index. When the item not stored in advance is requested, the dynamic profile may include an item included in the newly generated response. The second server device 300 may not need to process and analyze raw data. In various embodiments, the analysis results stored in the dynamic profile may be shared with the second server device 300 and may be used again.

In a state where the second server device 300 knows a plurality of items included in the static profile, the second server device 300 may transmit a query for making a request for all or part of the plurality of items, to the first server device 200. For example, the profile 254 provided by the first server device 200 may have three indexes including "name", "gender", and "age"; it is assumed that each respective index has items of "Hong Gil-dong", "male", and "thirties". The second server device 300 may make a request for all or part of the three items. The profile conversion module 240 of the first server device 200 may transmit a response to the query, which includes all or part of the profile 254, to the second server device 300. When a query for making a request for information about the user's "age" is received, the profile conversion module 240 may transmit a response including "thirties" as the item written in the "age" index, to the second server device 300.

The second server device 300 may transmit, to the first server device 200, a query including a request for a new item. The profile conversion module 240 may analyze the log data 252 and the profile 254 stored in the first server device 200 and may generate the new item as the dynamic profile.

In a state where indexes include a name, a gender, an age, a home address, and favorite ingredients in at least part of the user profile stored in the first server device 200, the second server device 300 providing a pizza-related service may make a request for an item of "the user's favorite pizza menu", to the first server device 200. When the search of an index corresponding to "the user's favorite pizza menu" fails, the profile conversion module 240 of the first server device 200 may infer "favorite pizza menus" based on pieces of pre-stored information. For example, when "pineapple" or "potato" items are present in the stored "favorite ingredients" index, the profile conversion module 240 may infer "the user's favorite pizza menu" item as "Hawaiian pizza" associated with "pineapple" or "potato" pizza based on the fact that "pineapple" or "potato" items are present in the stored "favorite ingredients" index. In this operation, the profile conversion module 240 may obtain the pizza menu sold by the second server device 300 and recipe information of the pizza menu and may generate a pizza menu associated with the pineapple and the potato as a new item. The first server device 200 may generate "Hawaiian pizza" and "potato pizza" as an item for the "user's favorite pizza menu" index and may transmit a response including the generated item to the second server device 300. A method for generating a dynamic profile will be described with reference to FIG. 7.

The profile conversion module 240 may extract the keywords of "favorite" and "pizza" from the query message, the relationship between the extracted keywords, and at least one of the indexes. For example, the profile conversion module 240 may select "age" and "gender" as the index of the relationship for "favorite pizza" and may generate a new item corresponding to the "favorite pizza" (new index) based on the relationship between the item "the thirties" matched with the selected index "age" and the item "male" matched with the selected index "gender". Alternatively, the profile conversion module 240 may collect the preference item based on the items "thirties" and "male" and may generate a new item corresponding to the favorite pizza based on the collected preference item. The profile conversion module 240 may search for profiles of a plurality of other users with "thirties" and "male" as an item value. When "cheese pizza" is found in the preference item of the profiles of other users a specified number of times (e.g., 30 times) or more, the profile conversion module 240 may identify "cheese pizza" as reliable data and may generate "cheese pizza" as a new item for the new index "favorite pizza".

With regard to generating the new index, the profile conversion module 240 may generate the new index using at least one or more keywords extracted from the query message or may generate a natural language based on at least one keyword to utilize the natural language as the new index. With regard to item extraction corresponding to the new index, the profile conversion module 240 may randomly select at least one pre-stored indexes. Alternatively, the profile conversion module 240 may select at least one index based on a previous history (e.g., a history used to generate a new index), or may calculate the relationship between the new index and pre-stored indexes based on the at least one algorithm used to calculate the specified relationship and then may select indexes of the specific number, the result value of each of which is relatively high.

The first server device 200 may fail to infer the item requested by the query of the second server device 300. For example, in a state where the profile 254 has indexes including "name, gender, and age" and three items are respectively matched with each index, the first server device 200 may receive a query for making a request for the item of "preferred pizza menus", from the second server device 300. It may be difficult for the first server device 200 to infer the item of "preferred pizza menus" based on only the items included in the name, the gender, and the age. In this case, the first server device 200 may transmit a message to the second server device 300 indicating that it is impossible to send a response to the query. When the first server device 200 may not identify the index associated with the query of the second server device 300, the first server device 200 may fail to infer the item requested by the query. When the profile 254 includes only the item "Il-do Park" for the index of "name", the first server device 200 may not identify the index associated with the query of "preferred pizza menus". In this case, the first server device 200 may transmit a message to the second server device 300 indicating that it is impossible to send a response to the query.

The first server device 200 may select a common item among the collected items, as the preferred pizza menu. For example, when the number of the factors (e.g., index "name" or item "Il-do Park") used in the relationship calculation is less than the specified number, the first server device 200 may provide a notification that it is impossible to respond to the query. Alternatively, the first server device 200 may generate a new item through the relationship calculation using finite factors to respond to the second server device 300, and the first server device 200 may provide a notification that the reliability of the corresponding item is less than the specified value (e.g., send a message indicating that the reliability is not greater than the specified value).

The query including a request for a new item may have two forms. The first form may correspond to the response in the unrestricted form. When receiving a query in the first form, the profile conversion module 240 may generate a response in a general form, not a fixed form. The query may include one or more interrogatives such as who, what, when, where, why, how, or which. The second form may correspond to the response in the restricted form. When receiving a query in the second form, the profile conversion module 240 may generate a response in the specified form based on the type of query, as shown below in Table 1.

TABLE 1

| Category in a second form | Example of query of a second form and corresponding response |
|---|---|
| 2-1 Form (Yes/No) | Query type: "~is it?" "~isn't it?" Response: Limited to 'Yes' or 'No'. [Example] Query: do you like wine? Response: Yes Query: do you like beer? Response: No |
| 2-2 Form (selection) | Query type: "which of~do you~?" Response: To be restricted to be selected among the selected items included in the query. [Example] Query: what do you like, coffee, tea, juice, or water? Response: coffee, water |
| 2-3 Form (order) | Query type: "what is an order to~among~?" or "what do you~most~among~?" Response: To be restricted to determine an order among given options. [Example] Query: what is the preference order of potato, Hawaiian, and super supreme among pizza menus? Response: super supreme, potato, Hawaiian |

Figure 4:
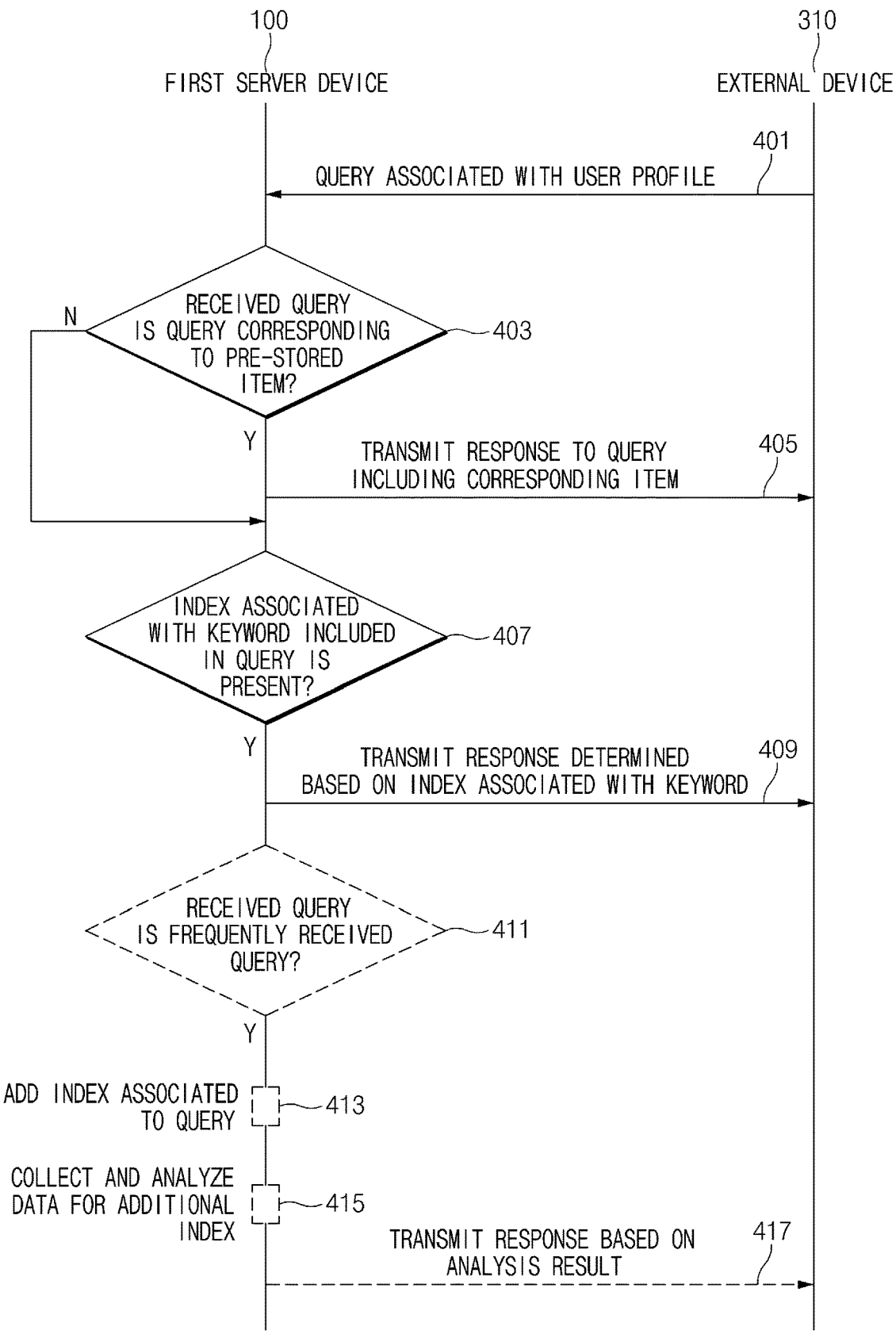
FIG. 4 is a signal flowchart illustrating a user profile providing method, according to an embodiment.

FIG. 4 is a signal flowchart illustrating a user profile providing method, according to an embodiment.

Referring to FIG. 4, the user profile providing method includes steps 401 to 417. Steps 401 to 417 may be executed by the first server device 200 illustrated in FIG. 3A. For example, steps 401 to 417 may be respectively implemented with instructions capable of being performed (or executed) by the processor 210 of the first server device 200. The instructions may be stored in a computer-readable recording medium or the memory 220 of the first server device 200 illustrated in FIG. 3A. Hereinafter, with respect to the descriptions about steps 401 to steps 417, descriptions which are equivalent to those shown in FIG. 3A may not be repeated.

In step 401, the first server device 200 receives a query associated with a user profile from an external device 310. For example, the query may be a query for making a request for the user profile necessary for the service (hereinafter referred to as a "first service") provided by the external device 310 (or a service providing server device). The query may be a query for making a request for the user profile for a user of the first service (e.g., a user has an account registered in an external device providing the first service to utilize the first service).

In step 403, the first server device 200 determines whether the query received from the external device 310 is a query corresponding to the item matched with the pre-stored index or the corresponding index. For example, the first server device 200 may identify the index associated with the received query and may determine whether the received query is a query corresponding to the pre-stored item, based on the identified index.

In step 405, the first server device 200 transmits the response including an item corresponding to the query to the external device 310, when the query is a query corresponding to the pre-stored item. The profile conversion module 240 may generate a response including the items corresponding to the query without a separate conversion for the items stored in the profile 254 and may transmit the generated response to the external device 310.

In step 407, when the query is a request for an item not stored in advance, the first server device 200 determines whether the item associated with at least one keyword included in the query is included in the profile 254. The first server device 200 may extract at least one keyword included in the query and may identify the relationship between the extracted keyword and an index. With regard to identifying the relationship, the first server device 200 may operate an algorithm or database that defines the relationship between an index and various keywords. Alternatively, the first server device 200 may communicate with a separate server device providing information about the corresponding relationship and may provide the corresponding server device with a keyword to identify the index having the relationship.

A plurality of items included in the profile 254 may have a relationship between each other. The plurality of items may have ontology depending on the relationship. The first server device 200 may use numerical data indicating the relationship between the plurality of items. If the relationship is relatively strong, then the numerical data may be configured to have a relatively high value. The numerical data may be stored in the profile database 250 in advance.

At least one keyword included in the query may include a word the same as or similar to the pre-stored at least one index. For example, when the query is "what is the preference order of "potato", "Hawaiian", or "super supreme" in pizza menus?", the keyword may be determined as at least one of "pizza", "potato", "Hawaiian", or "super supreme". When the relationship between the pre-stored first index and the determined keyword is high, the first server device 200 may generate the response including at least one item matched with the first index, as will be described with reference to FIG. 7.

When the numerical data is not less than predetermined threshold value, the first server device 200 may determine that the keyword is associated with the index. The threshold value may be updated according to a software update.

In step 409, when it is determined that the keyword included in the query is associated with the index, the first server device 200 transmits a response (e.g., a response including an item matched with the index) determined based on the associated index, to the external device 310.

When it is determined that the associated index is not present, the first server device 200 may add the keyword included in the query as a new item to the profile 254. For example, the keyword included in the query may be added as one index included in the profile 254. The keyword may correspond to (e.g., be included in or be mapped to) the name of the index to be added. The name of the index to be added may not be limited to the keyword included in the query, and the word associated with the query may be the name of the index to be added.

In step 411, the first server device 200 determines whether the received query is the frequently received query. For example, when the query including the same keyword is received during the specified period for the specified number of times or more, the first server device 200 determines that the query as the frequently received query.

With respect to the frequently received query, in step 413, the first server device 200 adds the keyword included in the query as one index to the profile 254. In step 415, the first server device 200 collects data for the additional index (e.g., collect and determine the item to be matched with the additional index) and may perform analysis (e.g., a profiling task).

Instead of step 411, the first server device 200 may transmit a message to the external device 310 asking whether to add a query to the index of the profile 254. When a positive response to the message is received, the first server device 200 may add the keyword included in the query to the index of the profile 254.

An index management module that determines whether to add the index for items that are requested to be added by the external device may be included in the first server device 200. In addition to the above-described method, the number of indexes and the number of items to be matched with an index may be restricted depending on the feature (i.e., type) of data to be collected and the environment in which the data is collected. For example, the index management module may restrict the addition of the item corresponding to the enquiry made by an external device that is not authorized for specific personal information or may restrict the addition of the item capable of being abused. The index management module may also delete indexes with few query response requests by external devices (when response requests occur during the specified period the number of times or less), and may delete items matched with the indexes with few response requests. Furthermore, the index management module may predict the demand of external devices and then may also add indexes and items according to the demand.

Figure 5:
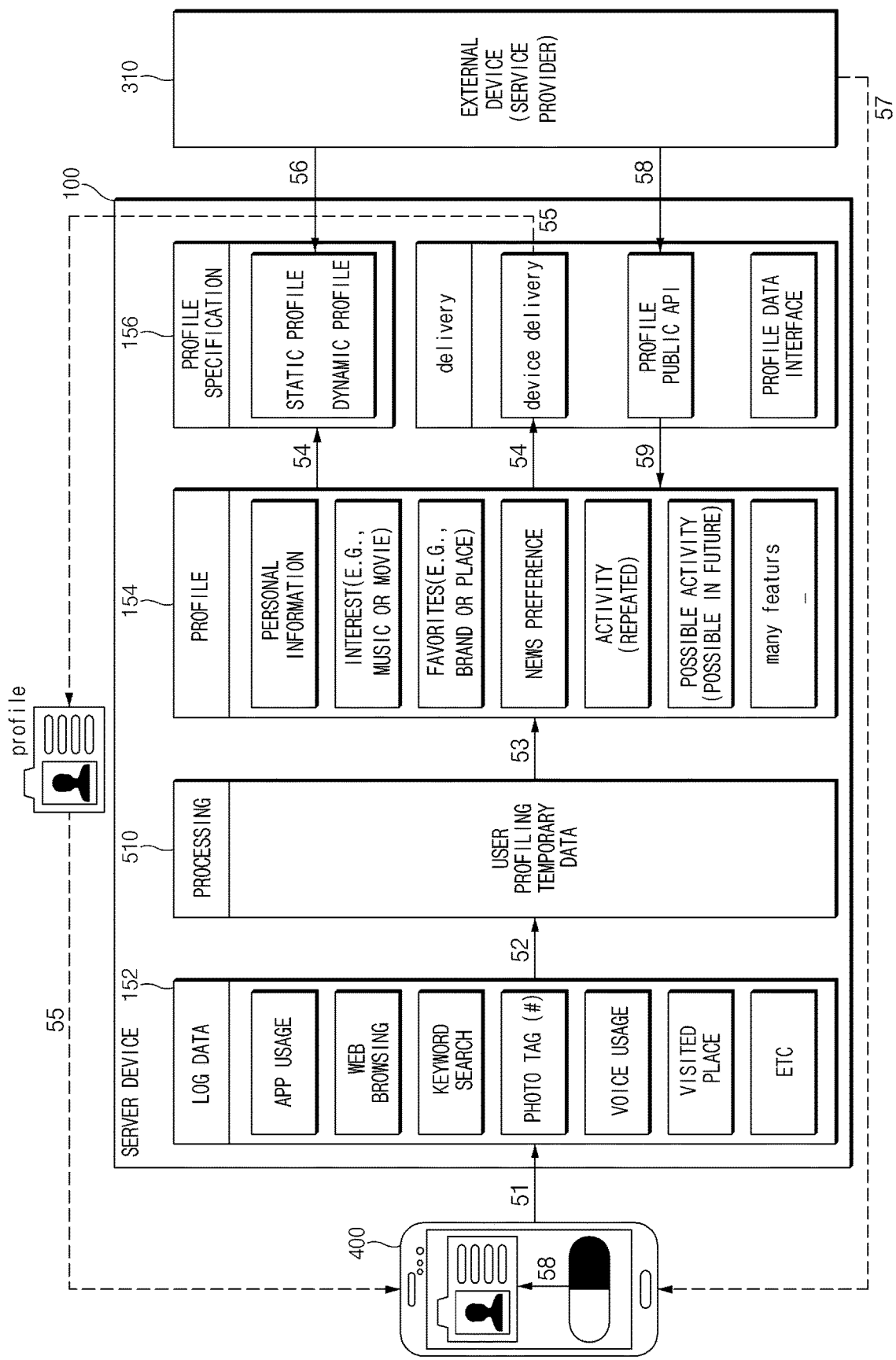
FIG. 5 illustrates a method of generating a profile, according to an embodiment.

FIG. 5 is a view for describing a method of generating a profile, according to an embodiment.

Referring to FIG. 5, the first server device 200 obtains the log data 252 of various categories from a user device 400 in step 51. For example, the log data 252 may include log data associated with application usage, log data associated with web browsing, log data for the found keywords, log data for tags included in an image file, log data associated with voice function usage, and log data associated with the user's location. The first server device 200 analyzes the log data 252 and then generates the profile 254 in steps 52 and 53. The processor 210 of the first server device 200 may generate the profile 254 through the procedure of a predetermined processing 510. The profile 254 may include at least one index associated with a user profile and at least one item matched with the index. The profile 254 may further include at least one category corresponding to the category of the at least one index. The item may be composed of a piece of data or one data set.

The profile 254 may have a plurality of indexes, and at least one item may be mapped to one index. The category may include user personal information, interests, favorite items, news preferences, activities, and possible activities. The index associated with the user personal information may include information such as a user name, a gender, an age, a height, and a weight. The index associated with the interests may include information such as music, a movie, and cooking. The index associated with the favorite items may include information such as a location, a brand, and a color. The index associated with the news preferences may include information such as stocks, society, politics, and economy. The index associated with the activities or the possible activities may include information such as climbing, swimming, and golf.

The first server device 200 may determine whether the received query is associated with at least one index among a plurality of indexes. When the relation between at least one index and the received query is more than a specified value, the first server device 200 may determine at least one item included in the at least one index as a response to the query.

The profile 254 is classified depending on the specification in step 54. The profile determined as being provided to service providing servers (e.g., the at least one external device 310) providing a user with a specified service may be classified as a static profile; the profile generated depending on the request (query) without being predetermined may be classified as a dynamic profile.

The profile 254 may be stored in the first server device 200 or may be stored in the user device 400. The first server device 200 transmits a part of the profile 254 to the user device 400 in step 54 and in step 55. When the profile 254 is stored in the user device 400, the external device 310 directly transmits a query to the user device 400 in step 57. When the profile 254 is stored in the first server device 200, the external device 310 transmits a query to the first server device 200 in step 56. The query is generated based on the public API previously distributed for the first server device 200 in step 58.

FIG. 6 is a view illustrating an example of a data structure of profile data, according to an embodiment.

The profile 254 may include a plurality of categories, a plurality of indexes, and a plurality of items. The plurality of indexes may belong to one category; furthermore, at least one item may belong to one index. Referring to FIG. 6, profile data includes a category 601, an index 603, an index code 605, a value type 607, a place 609 at which an item is stored, and an item example 611.

The profile 254 may be stored in a platform (e.g., the intelligent environment 10 of FIG. 2) including a device 400 of a user and/or the first server device 200. Information corresponding to the platform may be included in the field 609.

Only the value of a specific item may be stored in the user device 400. In this case, when a query for an item is received from the external device 310, the first server device 200 may obtain a value from the user device 400 to generate the response to the query or the user device 400 may directly generate the response to transmit the response to the external device 310.

Public API for the query for the item stored in only the first server device 200 may be provided. For example, when an index code "demo.income" is stored in only the first server device 200, the external device 310 may generate the query for "demo.income", using the distributed public API and may transmit the query to the first server device 200. The item may be exemplified as USD 85K-100K, and the response including the corresponding value may be transmitted from the first server device 200 to the external device 310.

The profile 254 may be classified into a static profile and a dynamic profile. The static profile may include items stored in the profile database 250 in advance. For example, fields 620 and 622 may be included in the static profile. The field 620 may include predetermined factors depending on the settings of the intelligent environment 10. A field 624 may include factors added to the profile 254 at the request of the external second server device 300. For example, factors included in the field 624 may be the index and the item, which are added in step 411 to step 415 in FIG. 4.

In step 403 of FIG. 4, the first server device 200 determines whether the received query is a request for the static profile or whether the received query is a request for the dynamic profile. When the received query includes a request for an item, which is included in the pre-stored profile 254, in the profile database 250, the received query may include the request for the static profile. When the received query includes a request for an item not included in the profile 254, the received query may include the request for the dynamic profile.

The first server device 200 may identify the index associated with the received query and may determine whether the query is a query corresponding to the pre-stored item based on the identified index. When the first index (e.g., the gender, name, income, marital status, and/or birthday provided in field 620) corresponding to at least one item included in the static profile is identified, the first server device 200 may determine the query as the query for the pre-stored item. When at least one index included in the dynamic profile or the second index (e.g., yes-no, choice, or adhoc ranking corresponding to field 624) corresponding to an item is identified, the first server device 200 may determine that the query as the query for the item is not pre-stored.

The dynamic profile may include the index or items, which are not stored in the profile database 250 and which are requested by the second server device 300. The index or items included in the dynamic profile may include the index or items generated through the analysis procedure based on the log data 252 and the profile 254 currently stored in the first server device 200. The field 624 may be included in the dynamic profile. The field 624 may include the index or items that are stored in the different forms depending on the building form of the query. In the query of the above-described second form, the index name generated by the query corresponding to form 2-1 of Table 1 may be "yes-no"; an index code "adhoc.yes-no?q=espresso" and the stored item form may be stored in the form of yes (TRUE) or no (False).

Figure 7:
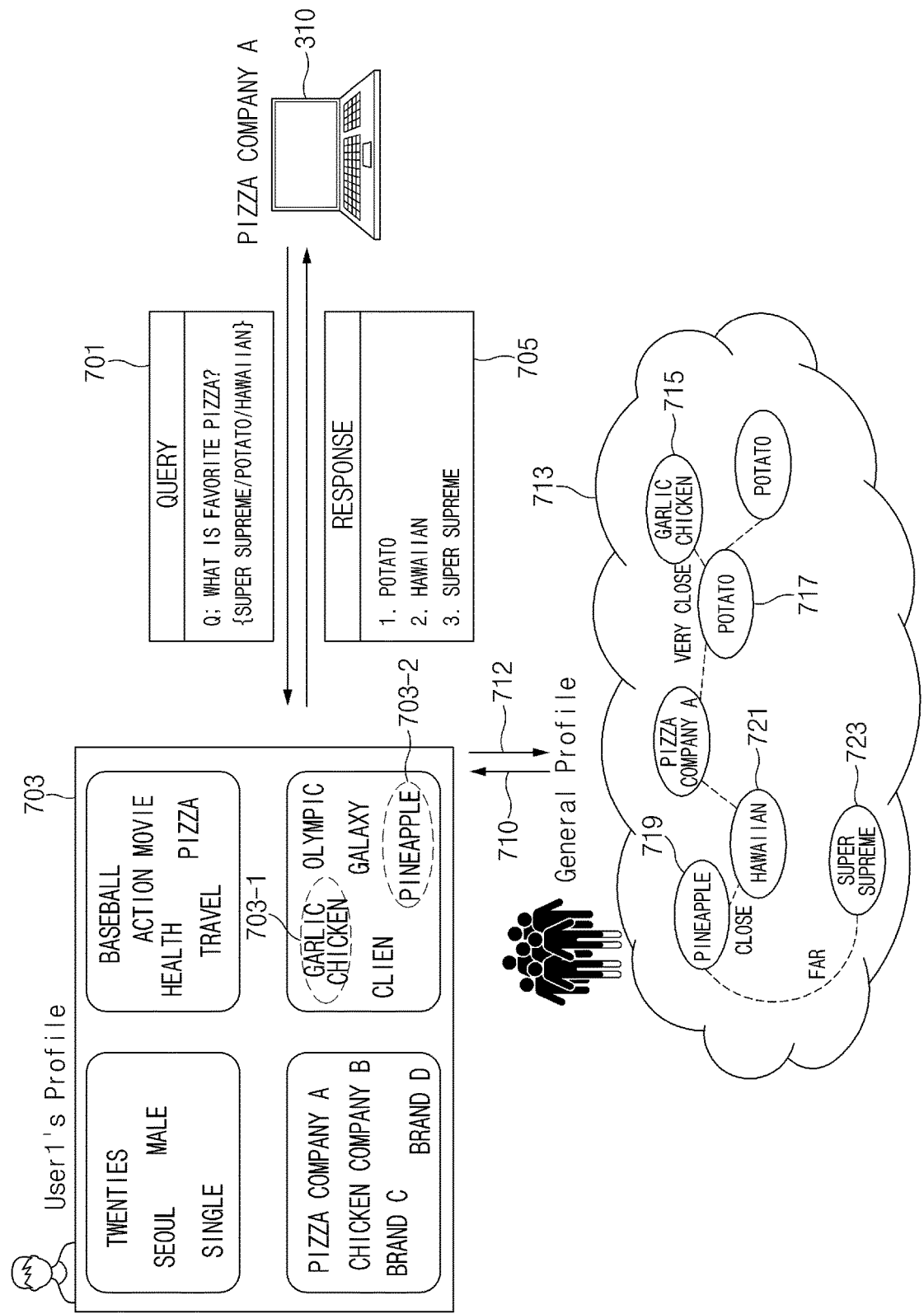
FIG. 7 is a flowchart illustrating an operation of generating a response to a query for an item that is not stored, according to an embodiment.

FIG. 7 is a flowchart illustrating an operation of generating a response to a query for an item that is not stored, according to an embodiment.

Referring to FIG. 7, it may be assumed that the external device 310 operated by "pizza company A" transmits query 701 to the first server device 200, and receives a response 705 to the query 701. For example, the external device 310 of the "pizza company A" may include the external device 310 for supporting the service of a company providing a service (e.g., pizza recommendation service) associated with pizza.

The first server device 200 may receive the query 701 for user 1 that is a specific user, from the external device 310. The query 701 may include "what is the favorite pizza of user 1 from among "super supreme pizza", "potato pizza", and "Hawaiian pizza"?". The query 701 may correspond to the query in form 2-3 of Table 1.

Referring to a profile 703 associated with user 1, because items included in the query 701 are not stored, the query 701 may correspond to a query including a request for items not included in the existing profile 703.

The profile conversion module 240 of the first server device 200 may determine the relationship between a super supreme pizza, a potato pizza, and a Hawaiian pizza being the keywords included in the query 701 and the pre-stored profile 703. Referring to the profile 703, a garlic chicken 703-1 and a pineapple 703-2 may be pre-stored items.

A general profile 713 that digitizes the relationship between stored items for all users including user 1 may be defined. The general profile 713 may be stored in the profile database 250. Referring to the general profile 713, a "Hawaiian" item 721 included in the query 701 may be defined as having a strong relationship (e.g., a relationship whose the index is more than a specified value) with a "pineapple" item 719 previously stored in the profile 703 of user 1. The distance between two items stored after being digitized may be within a specified distance (e.g., when the digitized information is entered in the specified coordinate system, the distance between two entered coordinates is within the specified distance). The "potato" item 717 included in the query 701 may be defined as having a very strong relationship with "garlic chicken" item 715. For example, it may be understood that the distance between two items is a distance closer than the distance between item 721 and item 719. On the other hand, the "super supreme" item 723 included in the query 701 may be defined as having a weak relationship (e.g., a relationship of which the index is less than a specified value) with the associated "pineapple" item 719.

The first server device 200 may determine the preference order of user 1 as "potato pizza", "Hawaiian pizza", and "super supreme" based on the relationship defined in the general profile 713 and may generate a new item. The first server device 200 may transmit the response 705 including the newly generated item to the external device 310.

Figure 8:
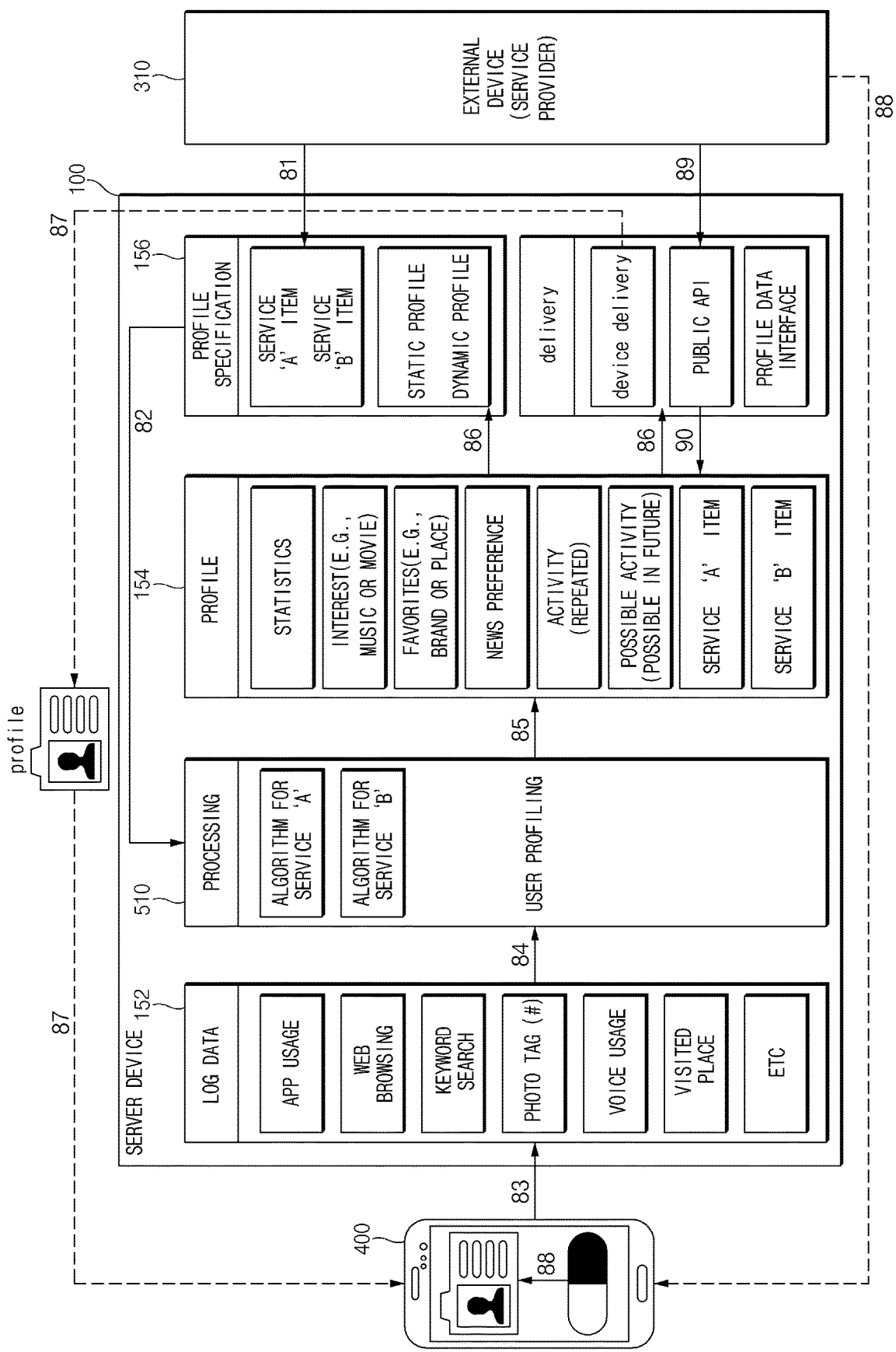
FIG. 8 illustrates an operation of adding a new item, according to an embodiment.

FIG. 8 illustrates an operation of adding a new item, according to an embodiment. FIG. 9 is one example of a data structure of newly added profile data, according to an embodiment.

Referring to FIGS. 8 and 9, the index and item, which are generated depending on the received query, may be added to the profile 254 by the external device 310. When the response to the query is not possible using items stored in the profile 254, the item included in the query and the index corresponding to the item may be newly added to the profile 254. Parts of the description describing FIG. 8 which are equivalent and/or correspond to features that are illustrated in FIG. 5 may not be repeated here.

The analysis algorithm for a new index and an item matched with the new index may be added such that analysis of new items is possible based on the existing log data 252 and the existing profile 254. The newly added algorithm may be applied to the profiling process 510 (e.g., the algorithm for service "A" or the algorithm for service "B"). The different algorithms may be added for each external device of service providers that are different from one another.

The first server device 200 may add the category of the collected log data 252. The new index may be added to the log data 252; alternatively, a new item may be added to an existing index. In addition, the first server device 200 may receive data necessary for the new index and/or new item, from the external device 310. The first server device 200 may process a new query based on the newly added log data 252.

The new index or new item may be configured to be provided to only the external device of the corresponding service provider or may be configured to be provided to the external devices of all service providers. The public API may be updated to build the query for the new index or the new item. The external device 310 may generate a request for the newly added index or the newly added item as a query, using the public API in step 89 and 90.

Referring to FIG. 9, the first server device 200 may map the items added in association with a specific service to an index for the specific service to manage the mapped result. The first server device 200 may allocate a separate index 903 and a separate index code 905 such that the added first index and the added first item, depending on the request by a service providing server device "A" operated by a service provider "A", are distinguished from the added second index and the added second item, depending on the request by a service providing server device "B" operated by a service provider "B".

The service providing server device may deliver information about the logic or algorithm, which analyzes the log data 252 and the profile 254, to the first server device 200 to obtain a new item. For example, the "favorite pizza menu" index requested by the service providing server device "A" may be determined by the analysis task that identifies the item associated with pizza in the log data of the web search of a user and adds the rank of pizza menus to the item depending on the frequency of which the item associated with the pizza menu occurs (i.e., appears in a search of the user). When it is determined that the favorite pizza menu is added, a module implemented to perform the corresponding analysis task may be added to the memory 220 of the first server device 200. The favorite pizza menu of the index 903 may belong to a service category "A"; the index code 905, the value type 907, the item assignment state 909, and the logic or algorithm 911 corresponding to the index may be written as a profile value. FIG. 9 illustrates the single index 903, the single index code 905, the single value type 907, the single item setting 909 and the single logic/algorithm 911 being assigned to one service (e.g., service "A"). However, the disclosure is not limited thereto. For example, a plurality of indexes may be included in one service; and a plurality of items may be included in one index.

Figure 10:
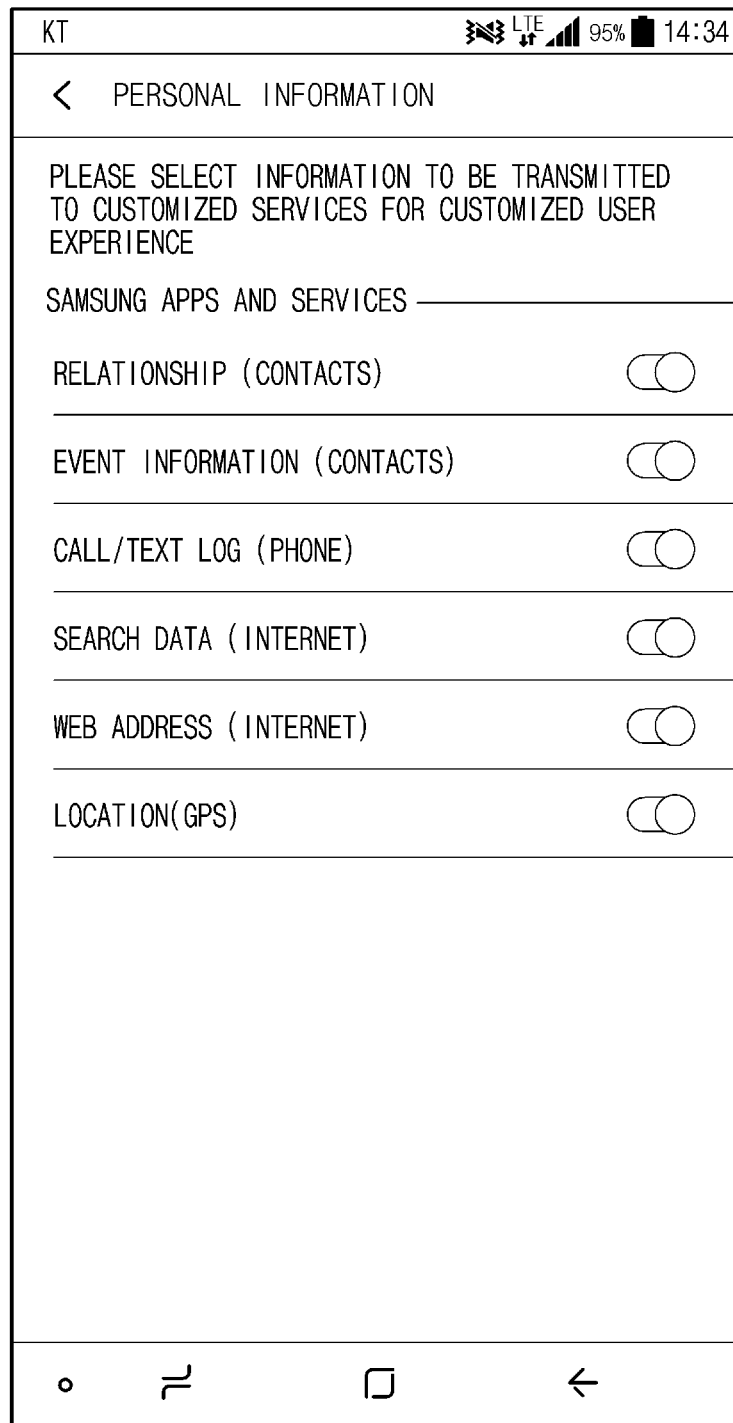
FIG. 10 illustrates an example of a user interface of an electronic device, according to an embodiment.

FIG. 10 illustrates an example of an interface of an electronic device of a user, according to an embodiment.

Referring to FIG. 10, an interface 1010 including a list of information collected from the user device 400 is illustrated. A user may determine what category of information is collected through the interface 1010 and is generated as a profile. The user may determine whether the collection is turned on/off depending on the category of data through the interface 1010.

When the size or category of data collected or analyzed is changed, an interface for providing a notification that the size or category of data is changed may be provided to the user. Also, an interface for determining whether the user agrees with the notification may be provided. When an additional request for a new item of a service provider occurs, an interface for notifying the user that the additional request occurs and for receiving consent may be provided.

An electronic device (e.g., the first server device 200) may include a network interface 205 communicating with an external device operated by a service provider providing a first service, at least one memory 220 storing a user profile including at least one item, and at least one processor 210 operatively connected to the network interface 205 and the at least one memory 220. The at least one processor 210 may be configured to receive a query associated with the user profile from the external device, to determine whether the query corresponds to the at least one item included in the user profile, to transmit a response including the at least one item to the external device when the query corresponds to the at least one item, to generate a new item, which corresponds to the query and which is not included in the user profile when the query does not correspond to the at least one item, and to transmit a response determined based on the new item, to the external device.

The user profile may include at least one index, and the at least one item may be matched with the at least one index.

The at least one processor may be configured to extract at least one keyword included in the query, to select an index in which a correlation indicating a relationship between the keyword and the at least one index is not less than a specified value, and to generate the new item based on at least one item included in the selected index.

The at least one processor may be configured to determine that the at least one index is associated with the at least one keyword, when a value defined between the at least one keyword and the at least one index is not less than a threshold value based on numerical data indicating the relationship.

When the at least one keyword included in the query coincides with a first index of the at least one index, the at least one processor may be configured to transmit a stored item corresponding to the first index as the response to the external device.

The at least one processor may be configured to add an additional index or an additional item corresponding to the at least one keyword, to the at least one memory when the query does not correspond to the at least one item.

The at least one processor may be configured to determine that the associated index associated with the at least one keyword is not present, when a value defined between the at least one keyword and the at least one index is less than a threshold value based on numerical data indicating the relationship, and to add the additional index or the additional item to the at least one memory when the associated index is not present.

The at least one processor may be configured to add the additional index or additional item to the at least one memory when the query is received a predetermined number of times or more.

The at least one processor may be configured to transmit a message for determining whether to add the at least one keyword, to the external device when the query does not correspond to the at least one item, and to add the additional index or the additional item when a response to the message is received from the external device.

The at least one memory may store an analysis module corresponding to the additional index or the additional item, and the at least one processor may be configured to set a value corresponding to the additional item based on the analysis module and the at least one index.

The at least one processor may be configured to map the additional index or the additional item to the first service to store the mapped result in the at least one memory.

The at least one processor may be configured to receive a second query from an external device operated by a service provider of a second service and to add a second additional index or a second additional item corresponding to the at least one keyword included in the second query, to the at least one memory when the second query does not correspond to the at least one item. The second additional index or the second additional item may be mapped to the second service and stored in the at least one memory.

The at least one memory may store log data associated with the user.

The at least one processor may be configured to obtain the log data from a user device communicating through the network interface or the external device.

As described above, a system (e.g., the first server device 200) may include a network interface 205, at least one processor 210 operatively connected to the network interface 205, and at least one memory 220 operatively connected to the processor 210. The at least one memory 220 may be configured to store a user profile including a plurality of indexes and a plurality of items associated with the plurality of indexes, and the at least one memory 220 may store instructions that, when executed, cause the processor 210 to receive a query associated with the user profile from an external server through the network interface, to identify whether the query is associated with at least one index among the plurality of indexes, to identify a relationship between at least one item of the plurality of items based on ontology when the query is not associated with the at least one index among the indexes, to determine a response to the query based at least partly on the relationship, and to provide the response to the external server through the network interface.

The instructions may cause the processor to determine at least part of the user profile as a response to the query when the query is associated with the at least one index among the plurality of indexes.

The relationship may include a value indicating a correlation corresponding to the at least one item of the plurality of items.

The instructions may cause the processor to determine whether the value exceeds a threshold value, and to determine at least one item different from the at least one item of the plurality of items, as a response to the query when the value exceeds the threshold value.

The at least one memory may store a database including first data at least partly used to generate the user profile. The instructions may cause the processor to change the database such that the database further stores items at least partly associated with the query when the value does not exceed the threshold value.

The instructions may cause the processor to further use second data, which is included in the database and which is different from the first data, to generate a profile when the value does not exceed the threshold value.

A method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server, or may be generated temporarily.

Each component (e.g., a module or a program) of the above-described components may include a single entity or a plurality of entities. One or more components of the above-described components or operations may be omitted, or one or more other components or operations may be added. Additionally or alternatively, a plurality of components (e.g., a module or a program) may be integrated into one component. In this case, the integrated component may perform one or more functions of each component of the plurality of components in a manner that is the same as or similar to that which may be performed by the corresponding component of the plurality of components prior to the integration. Operations executed by modules, programs, or other components may be executed in a successive method, a parallel method, a repeated method, or a heuristic method, or one or more of the operations may be executed in different sequences or omitted. Alternatively, one or more other operations may be added.

According to various embodiments of the disclosure, it is possible to newly generate a profile based on a request for a profile even if the profile has not yet been prepared. A newly generated profile may be provided in response to the request.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A first electronic device, comprising:
communication circuitry configured to communicate with a second electronic device;
at least one processor; and
memory for storing a plurality of indexes, a plurality of items, each of the plurality of indexes being matched with at least one item, and
instructions that, when executed by the at least one processor individually or collectively, cause the first electronic device to:
receive, via the communication circuitry, a query message from the second electronic device for providing a first service,
extract a keyword included in the query message,
when the keyword corresponds to a first index among of the plurality of indexes, transmit, via the communication circuitry, a first response message including at least one item matched with the first index to the second electronic device,
when the keyword does not correspond to the plurality of indexes, select a second index in which a correlation indicating a relationship between the keyword and the second index is not less than a threshold value, the second index is one of the plurality of indexes,
generate a second response message based on at least one item matched with the second index, and
transmit the second response message to the second electronic device.

2. The first electronic device of claim 1, wherein at least one of the plurality of items is included in a user profile.

3. The first electronic device of claim 2, wherein the instructions, when executed by the at least one processor, cause the first electronic device to:
store log data associated with a user of the user profile in the memory.

4. The first electronic device of claim 3, wherein the instructions, when executed by the at least one processor, cause the first electronic device to:
obtain the log data from a user device or the second electronic device through a communication connection.

5. The first electronic device of claim 1, wherein the instructions, when executed by the at least one processor, cause the first electronic device to:
when a value defined between the keyword and the second index is not less than the threshold value based on numerical data indicating the relationship, determine that the second index is associated with the keyword.

6. The first electronic device of claim 1, wherein the instructions, when executed by the at least one processor, cause the first electronic device to:
when the query message included the keyword which does not correspond to the plurality of indexes is received a predetermined number of times or more, store the additional index or the additional item corresponding to the keyword to the memory.

7. The first electronic device of claim 1, wherein the instructions, when executed by the at least one processor, cause the first electronic device to:
when the keyword does not correspond to the plurality of indexes, transmit a message for determining whether to add the keyword, to the second electronic device; and
when a response message to the message is received from the second electronic device, add the additional index or the additional item corresponding to the keyword.

8. The first electronic device of claim 1, wherein the instructions, when executed by the at least one processor, cause the first electronic device to:
when each of correlation indicating the relationship between the keyword and the plurality of indexes is less than the threshold value, add an additional index or an additional item corresponding to the keyword, to the memory.

9. The first electronic device of claim 8, wherein the instructions, when executed by the at least one processor, cause the first electronic device to:
map the additional index or the additional item to the first service to store a mapped result in the memory.

10. The first electronic device of claim 9, wherein the instructions, when executed by the at least one processor, cause the first electronic device to:
receive a second query message from a second electronic device for providing a second service; and
when the second query message does not correspond to the plurality of the indexes, add a second additional index or a second additional item corresponding to another keyword included in the second query message, to the memory, and
wherein the second additional index or the second additional item is mapped to the second service and is stored in the memory.

11. An operation method of a first electronic device including a memory for storing a plurality of indexes and a plurality of items, each of the plurality of indexes is matched with at least one item, the operation method comprising:
receiving, via communication circuitry of the first electronic device, a query message from a second electronic device for providing a first service;
extracting a keyword included in the query message;
when the keyword corresponds to a first index among of the plurality of indexes, transmitting, via the communication circuitry, a first response message including at least one item matched with the first index to the second electronic device;
when the keyword does not correspond to the plurality of indexes, selecting a second index in which a correlation indicating a relationship between the keyword and the second index is not less than a threshold value, the second index is one of the plurality of indexes;
generating a second response message based on at least one item matched with the second index; and
transmitting the second response message to the second electronic device.

12. The operation method of the first electronic device of claim 11, wherein at least one of the plurality of items is included in a user profile.

13. The operation method of the first electronic device of claim 12, further comprising one of:
storing log data associated with a user of the user profile in the memory, or
obtaining the log data from a user device or the second electronic device through the communication connection.

14. The operation method of the first electronic device of claim 11, further comprising:
when a value defined between the keyword and the second index is not less than the threshold value based on numerical data indicating the relationship, determining that the second index is associated with the keyword.

15. The operation method of the first electronic device of claim 11, further comprising:
when the query message included the keyword which does not correspond to the plurality of indexes is received a predetermined number of times or more, storing the additional index or the additional item corresponding to the keyword to the memory.

16. The operation method of the first electronic device of claim 11, further comprising:
when the keyword does not correspond to the plurality of indexes, transmitting a message for determining whether to add the keyword, to the second electronic device; and
when a response message to the message is received from the second electronic device, adding the additional index or the additional item corresponding to the keyword.

17. The operation method of the first electronic device of claim 11, further comprising:
when each of correlation indicating the relationship between the keyword and the plurality of indexes is less than the threshold value, adding an additional index or an additional item corresponding to the keyword, to the memory.

18. The operation method of the first electronic device of claim 17, further comprising:
mapping the additional index or the additional item to the first service to store a mapped result in the memory.

19. The operation method of the first electronic device of claim 18, further comprising:
receiving a second query message from a second electronic device for providing a second service; and when the second query message does not correspond to the plurality of the indexes, adding a second additional index or a second additional item corresponding to another keyword included in the second query message, to the memory, wherein the second additional index or the second additional item is mapped to the second service and is stored in the memory.

20. A non-transitory computer-readable medium storing a plurality of instructions, wherein execution of the plurality of instructions by at least one processor individually or collectively causes a first electronic device to perform a plurality of operations comprising:

receiving a query message from a second electronic device for providing a first service;

extracting a keyword included in the query message;

when the keyword corresponds to a first index among of the plurality of indexes, transmitting a first response message including at least one item matched with the first index to the second electronic device;

when the keyword does not correspond to the plurality of indexes, selecting a second index in which a correlation indicating a relationship between the keyword and the second index is not less than a threshold value, the second index is one of the plurality of indexes;

generating a second response message based on at least one item matched with the second index; and transmitting the second response message to the second electronic device.

\* \* \* \* \*